United States Patent [19]

Yagishita et al.

[11] Patent Number: 5,034,127
[45] Date of Patent: Jul. 23, 1991

[54] FILTER ASSEMBLY FOR PURIFYING BRINE

[75] Inventors: Aisaburo Yagishita, Nagoya; Fumio Hine, Kasugai, both of Japan

[73] Assignee: Kabushiki Kaisha Sanshin Seisakusho, Japan

[21] Appl. No.: 441,217

[22] Filed: Nov. 28, 1989

Related U.S. Application Data

[60] Continuation of Ser. No. 149,144, Jan. 27, 1988, abandoned, which is a division of Ser. No. 831,807, Feb. 21, 1986, Pat. No. 4,746,441.

[51] Int. Cl.$^5$ ............................................. B01D 33/41
[52] U.S. Cl. ..................................... 210/337; 210/339
[58] Field of Search ............... 210/617, 255, 335–337, 210/339, 232, 282–284, 343; 55/483, 485

[56] References Cited

U.S. PATENT DOCUMENTS

| | | | |
|---|---|---|---|
| 2,012,196 | 8/1935 | Lewis et al. | 210/339 |
| 2,992,986 | 7/1961 | Ingram | 210/617 X |
| 3,577,341 | 5/1971 | Keith, Jr. et al. | 210/798 X |
| 3,638,793 | 2/1972 | Peck | 210/806 X |
| 3,859,067 | 1/1975 | Pasek et al. | 55/485 |
| 3,891,555 | 6/1975 | Bennett et al. | 210/335 |
| 3,929,639 | 12/1975 | Turrer et al. | 210/805 X |
| 4,001,115 | 11/1977 | Arvanitakis | 210/806 X |
| 4,028,241 | 6/1977 | Davis et al. | 210/806 X |
| 4,157,962 | 6/1979 | Huang et al. | 210/798 |
| 4,248,972 | 2/1981 | Fischer et al. | 210/180 |
| 4,340,487 | 7/1982 | Lyon | 210/797 X |
| 4,343,621 | 8/1982 | Benninger et al. | 210/779 X |
| 4,664,812 | 5/1987 | Klein | 210/283 |
| 4,746,441 | 5/1988 | Yagishita et al. | 210/779 X |
| 4,855,046 | 9/1989 | Meehan | 210/284 |

Primary Examiner—Tom Wyse
Attorney, Agent, or Firm—Shlesinger, Arkwright & Garvey

[57] ABSTRACT

The brine purifying system employs a multistage filtering apparatus comprising a plurality of the same filter units piled up one over another to form a plurality of cascaded filtering stages. When the filter layers of the filter units are clogged with unsoluble matters, the operation of the multistage filtering apparatus is interrupted, then a solvent for the unsoluble matters is circulated through the multistage filtering apparatus to remove the unsoluble matters arrested by the filter layers by dissolving the same therein. Then, a washing liquid is circulated through the multistage filtering apparatus to wash the multistage filtering apparatus completely. The solvent and the washing liquid used for regenerating and washing the multistage filtering apparatus are recovered and are used for dissolving salt to prepare saturated brine. The unsoluble matters thus removed from the filter layers are removed by being precipitated in a precipitating tank.

3 Claims, 3 Drawing Sheets

5,034,127

FILTER ASSEMBLY FOR PURIFYING BRINE

This application is a continuation of application Ser. No. 149,144, filed Jan. 27, 1988, which is a division of Ser. No. 831,807, filed Feb. 21, 1986, U.S. Pat. No. 4,746,441, now abandoned.

BACKGROUND OF THE INVENTION

The present invention relates to a method of purifying brine to be subjected to electrolyzation for producing caustic soda and chlorine, and a system for carrying out the same.

In electrolyzing salt, it is the usual practice is to supply brine, which has been prepared by dissolving salt in water and purified by removing impurities contained in the salt solution, to an electrolyzer. Recently, the electrolytic process for electrolyzing brine has been converted progressively from the membrane system to the ion exchange membrane system due to the increase in demand for electrolytic caustic soda of higher purity; consequently, the purification of brine has become regarded as important.

When brine containing much hardness components is supplied to the electrolytic process of the ion exchange membrane system, the performance of the ion exchange membranes deteriorates and the life of the same is remarkably reduced. Accordingly, the brine needs to be treated, through filtering layers packed with a chelate resin, to achieve high purification before the brine is supplied to an electrolyzer.

FIG. 1 illustrates a conventional brine purifying system. Referring to FIG. 1, dechlorinated dilute brine recovered from an electrolyzer 14 is returned from a dechlorinated dilute brine tank 13 to a saturated brine tank 1. The saturated brine tank 1 is replenished with salt and, if necessary, water to prepare saturated brine.

The saturated brine is supplied to a mixing tank 2, where caustic soda or sodium carbonate is mixed with the saturated brine to produce so-called brine mud. The saturated brine containing the brine mud is supplied to a thickner 3, where most of the brine mud is deposited and the deposited brine mud is discharged from the system from the bottom of the thickner 3.

Since the supernatant saturated brine supplied from the thickner 3 usually contains minute amount of insoluble solid matter, the supernatant saturated brine is stored temporarily in a supernatant saturated brine tank 4, and then the supernatant saturated brine is supplied to a filtering apparatus 6. The filtered and purified brine is stored in a purified brine tank 7, and then the purified brine is supplied to a chelate resin tower 8, where a small amount of the residual impurity ions are removed. Then, hydrochloric acid is added to the purified brine in a pH adjusting tank 9 to adjust the pH of the purified brine. Then, this high purity brine is supplied to the electrolyzer.

However, it has been found that the life of the chelate resin is greatly dependent upon the amount of suspended solid matter remaining in the brine and that a high degree of separation of the solid matter is necessary in addition to the solid matter separation achieved by the thickner. In order to meet such a requirement, purified brine is obtained by separating the solid matter from the saturated brine by means of the thickner. In order to achieve the satisfactory filtration of the supernatant brine through the perfect separation of the solid matters, the brine feed rate has to be reduced and the filtering apparatus needs to be washed frequently for regeneration, which causes increases in the brine purifying cost.

SUMMARY OF THE INVENTION

Accordingly, it is an object of the present invention to provide a method of purifying brine and a brine purifying system for carrying out the same which are capable of high purification of brine at a low cost.

The present invention improves the conventional brine purifying system for producing highpurity brine suitable for electrolyzation by the ion exchange membrane system, in which dilute brine recovered from the brine electrolyzer is saturated with salt again, and then the saturated brine is alkalified to separate solid matter therefrom. The alkalified brine is then passed through a fine filtering process, and then the filtered brine is then passed through the layers of a chelate resin.

The brine purifying system of the present invention includes a filtering apparatus equipped with fixed filtering layers. When the filtering efficiency of the filtering apparatus is reduced due to the accumulation of insoluble matter in the then fixed filtering layers, the supply of supernatant brine to the filtering apparatus is interrupted a solvent for the insoluble matter, containing hydrochloric acid, is supplied to the filtering apparatus and, if necessary, the solvent is circulated through the filtering apparatus to remove the insoluble matter from the fixed filtering layers by dissolving the insoluble matter. Then, the filtering apparatus is washed by filtered and purified brine or pure water, and the supernatant brine is supplied to the filtering apparatus to continue the filtering operation. All or part of the solvent, and the washing water or the washing brine are recovered and used for preparing the saturated brine.

Conventional brine purifying system require considerable work and labor for separating the mud arrested by the filtering apparatus by backwashing the filtering apparatus, for separating the mud from the washing water, and for discarding the separated mud. According to the present invention, since most of the mud is dissolved in the solvent and is returned to the salt dissolving tank, the work required for washing the filtering apparatus, and the downtime required for washing the filtering apparatus are reduced remarkably.

Furthermore, the filtering apparatus employed in the brine purifying system of the present invention is equipped with fixed filtering layers which need not be coated with a filtering agent; therefore, the operation of the filtering apparatus can be started immediately after the completion of washing. Hence, the operating rate of the brine purifying system is enhanced, which further enhances the efficiency of the brine purifying system.

Furthermore, according to the present invention, solvent and the washing water used for washing the filtering apparatus are recovered and are used for dissolving salt. This has never been tried in the conventional brine purifying system, and hence little washing water is discharged outside the system and all the washing water used for washing the filtering apparatus is utilized effectively as process water. On the other hand, although the solid matter removed from the filtering apparatus is returned to the salt dissolving tank, the solid matter is precipitated by alkalifying the primary brine and the precipitated solid matter is deposited in a thickner. Therefore, the removed solid matter never accumulate in the system, and never affect the operation of the brine electrolyzer adversely.

DESCRIPTION OF THE PREFERRED EMBODIMENT

Figure 1:
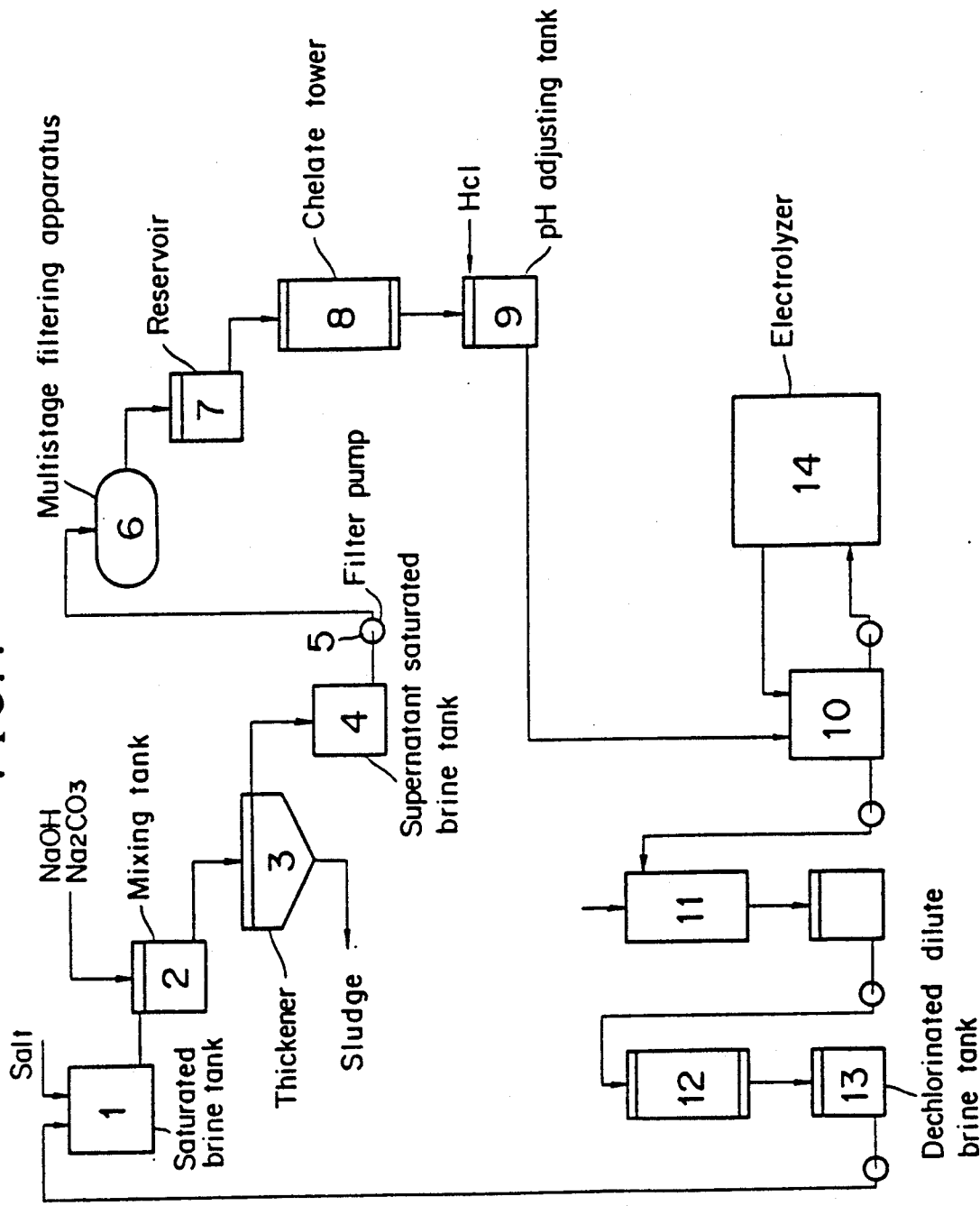
FIG. 1 is a block diagram of a conventional brine purifying system.
Figure 2:
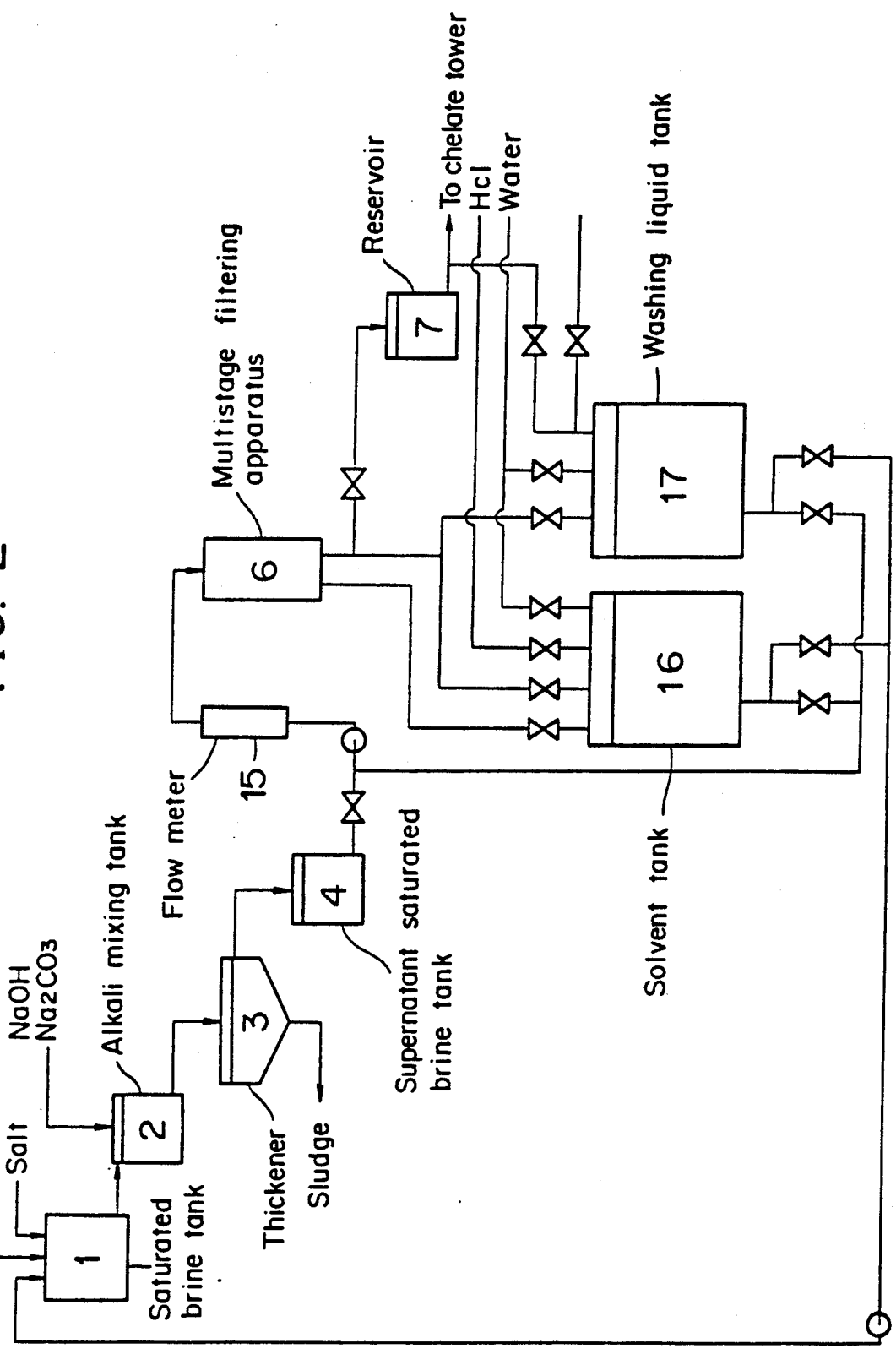
FIG. 2 is a block diagram of a brine purifying system, in a preferred embodiment, according to the present invention.

The brine purifying system of the present invention is illustrated in FIG. 2, except the multistage filtering apparatus and the associated apparatus thereof, and is practically the same as the conventional brine purifying system illustrated in FIG. 1. In FIGS. 1 to 4, like reference characters designate like or corresponding parts throughout.

Figure 4:
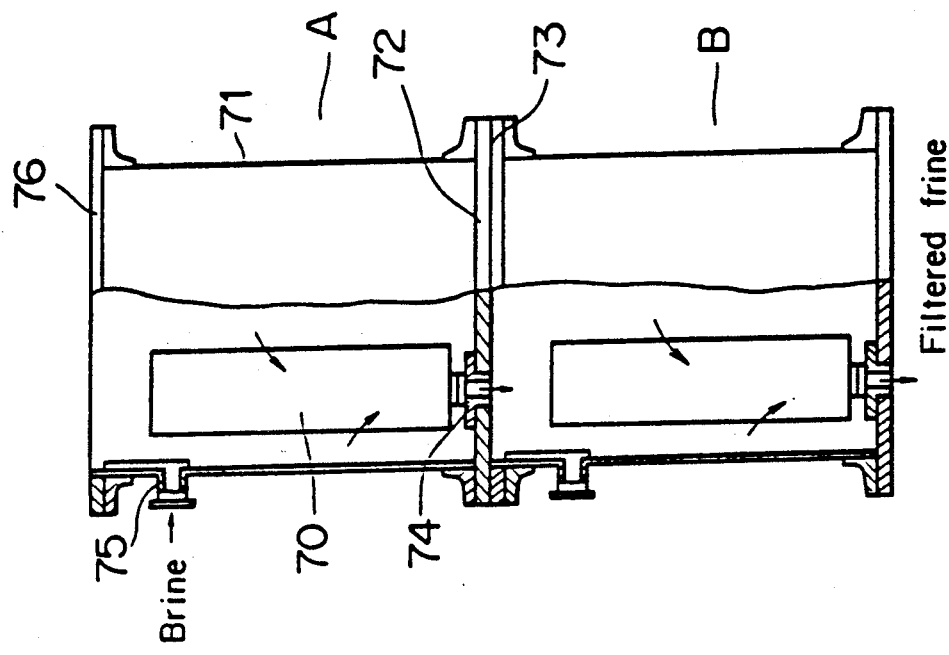
FIG. 4 is a partially cutaway side elevation of the multistage filtering apparatus of FIG. 3.

Referring to FIG. 2, saturated brine, prepared in a saturated brine tank 1, is supplied through an alkali mixing tank 2 and a thickener 3 to a supernatant brine tank 4. Supernatant brine is supplied by means of a filter pump 5 through flow meter 15 to multistage filtering apparatus 6 having fixed filter layers 7, as best shown in FIG. 4. The supernatant brine is filtered and purified by the filtering apparatus, and the purified brine is stored temporarily in reservoir 7. The purified brine is then supplied to chelate tower 8.

The supernatant brine contains minute flocks of insoluble matter consisting mainly of magnesium hydroxide, iron hydroxide, potassium carbonate and small amounts of clay and minerals. Normally, the concentration of the insoluble matters in the supernatant brine is about 10 mg/l. The accumulation of the insoluble matter in the fixed filter layers increases the filtering resistance of the fixed filter layers, and requires increased filtering pressure. Since the increase of the filtering pressure above an upper limit causes the insoluble matter to permeate the fixed filtering layers, the operation of the multistage filtering apparatus must be stopped and the multistage filtering apparatus washed before the filtering pressure reaches the upper limit.

Figure 3:
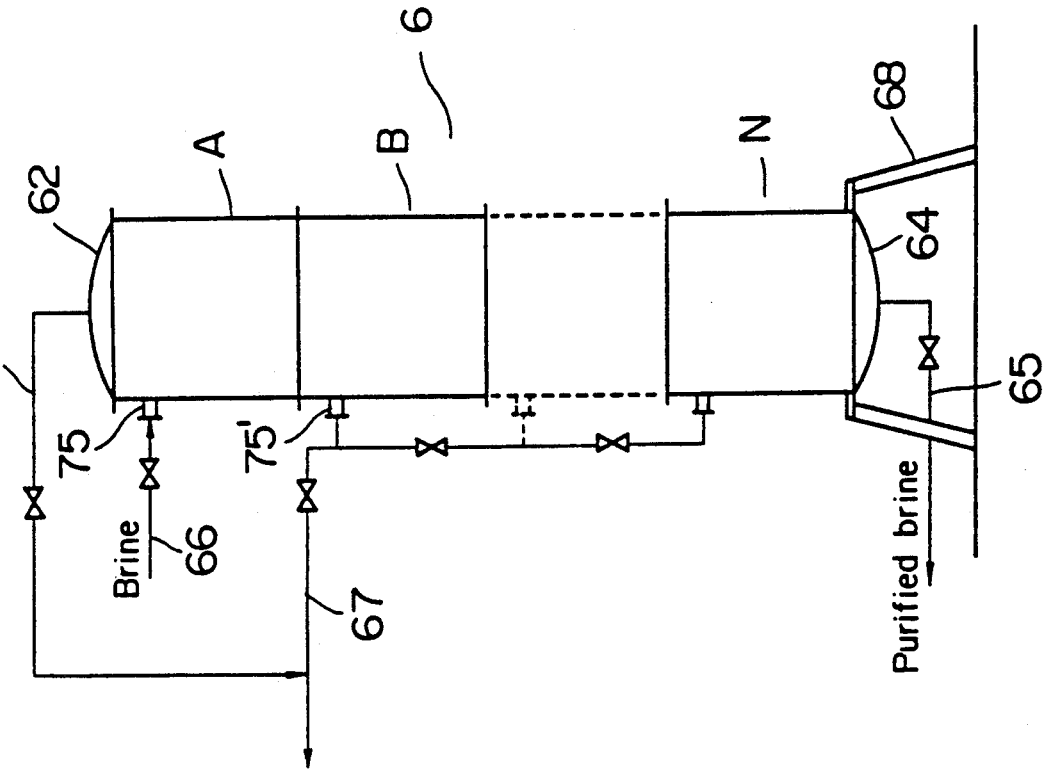
FIG. 3 is a conceptional illustration of a multi-stage filtering apparatus employed in the brine purifying system of FIG. 2.

The multistage filtering apparatus 6 and the peripheral apparatus will be described hereinafter with reference to FIGS. 3 and 4.

The multistage filtering apparatus 6 integrally comprises a plurality of filter units A, B, ... and N placed one over another, a top cover 62 and a bottom cover 64. An air pipe 63 is provided in the top cover 62 to increase or to reduce the internal pressure of the multistage filtering apparatus 6. A purified brine discharge pipe 65 is provided in the bottom cover 64. Each filter unit comprises a body 71 and a filter layer 70 provided within the body 71. A pipe 75 is attached to the side wall of the body 71; and the pipe 75 serves as both an air vent pipe and a liquid inlet pipe. A brine outlet 74 is formed in the bottom plate 72 of each filter unit, and the filter layer 70 is of the cartridge type and is attached to the brine outlet 74 so that the brine supplied into the filter unit passes through a first the filter layer 70 and flows into the next filter unit, through the brine outlet 74.

The periphery of the flat bottom plate 72 forms a lower flange 74, while an upper flange 76 is formed around the upper periphery of the body 71. A gasket is placed between the respective flanges of the adjacent filter units and the flanges are fastened together with bolts and nuts to join the adjacent filter units.

The multistage filtering apparatus 6 is mounted on a frame 68 and a brine supply pipe 66 and an air pipe 77 are connected to the multistager filtering apparatus 6. Standardized branch pipes are used for connecting the brine supply pipe 66 and the air pipe 77 to the filter units A, B ... and N, and hence the number of filter units can be changed simply by adding or removing the necessary number of filter units and connecting or disconnecting the filter units by the standardized branch pipes.

In starting the operation of the multistage filtering apparatus 6, first the air vent valves of the filter units A, B, ... and N are opened, and then the supernatant brine is supplied by the filter pump 5 into the top filter unit A. Then, the supernatant brine is filtered by the filter layer 70 of the filter unit A and the filtered brine flows into the next filter unit B. Thus the brine flows through the filter units A, B, ... and N successively and, finally, the filtered and purified brine is discharged through the purified brine discharge pipe 65 into the reservoir 7.

The level of the supernatant brine in the filter unit rises as the filter layer becomes clogged with the insoluble matter. When the level of the supernatant brine in the filter unit rises above a predetermined level, then the air valve is closed to raise the filtering pressure, and thereby the internal pressure of the filter unit rises gradually and a pressurized filtering mode is established automatically. As the filter layer becomes clogged further, then the filtering pressure increases. Then, the discharge pressure of the filter pump 5 increases and the suspended insoluble matters starts permeating the filter layer. The suspended insoluble matter permeating the filter layer of the preceding filter unit is arrested by the filter layer of the succeeding filter unit. When the filter layer of the last filter unit N is clogged with the insoluble matter, then the operation of the multi-stage filtering apparatus is interrupted and the multistage filtering apparatus is washed. The manner of washing the multistage filtering apparatus 6 will be described hereinafter.

A solvent containing hydrochloric acid is prepared in a solvent tank 16. Ordinarily, the solvent is a dilute hydrochloric acid solution, however, a salt solution acidified by hydrochloric acid or a solvent prepared by adjusting the acidity of the recycled solvent with hydrochloric acid may be used. The inlet valve $V_1$ and the outlet valve $V_2$ of the multistage filtering apparatus are closed and valves $V_3$ and $V_4$ are opened. Then the solvent contained in the solvent tank 16 is circulated through the multistage filtering apparatus 6 by means of the filter pump 5. The solvent may be circulated either in the same direction as that of the flow of the brine during the filtering operation or in the reverse direction. Most of the insoluble matter arrested by the filter layers 70 is dissolved in and carried away by the solvent. Thus, the filter layers are regenerated.

Then, the valve $V_4$ is closed to recover all by the solvent from the multistage filtering apparatus 6 and the solvent is returned to the solvent tank 16. Then, a valve $V_7$ is opened to supply the washing liquid contained in washing liquid tank 17 to the multistage filtering apparatus 6 by means of the filter pump 5. The residual solvent is washed from the multistage filtering apparatus 6 into the solvent tank 16. During the washing operation, the valve $V_3$ and a valve $V_5$ are kept open so that the multistage filtering apparatus is washed as completely as possible. The most simple washing liquid is water, however, an alkaline solution, such as a caustic soda solution, a salt solution or the filtered and purified brine contained in the reservoir 7 may be used as the washing liquid.

After the acid solvent remaining in the multistage filtering apparatus 6 has completely been washed out and recovered in the solvent tank 16, then the valves $V_3$ and $V_5$ are closed and valve $V_6$ is opened to circulate the washing liquid by means of the filter pump 5 and to recover the washing liquid in the washing liquid tank 17. Upon the recognition of the complete regeneration of the filter layers 70, the valve $V_7$ is closed and, after the residual washing liquid has been completely recovered, the valve $V_6$ is closed to complete the washing operation.

After the multistage filtering apparatus 6 has thus been washed, the valves $V_1$ and $V_2$ are opened to restart the filtration of the supernatant brine.

The solution, comprising the solution of the insoluble matter arrested by the filter layers 70 and contained in the solvent tank 16 and the used and recovered washing liquid contained in the washing liquid tank 17, is supplied at a low flow rate to the saturated brine tank 1 by means of a pump 18 and is used for dissolving salt or for other purposes.

As apparent from the foregoing description, the present invention reduces the work and labor required for operating a brine purifying system remarkably and, since the insoluble matter arrested by the multistage filtering apparatus, which requires complicated measures to be disposed of, is disposed of as sludges from the thickner, the brine purifying system of the present invention simplifies the disposal of the waste matters remarkably.

Furthermore, since all the liquid used for regenerating the multistage filtering apparatus, which used to be discharged from the system, is reused as the process water, the cost of the process water is reduced and waste water treatment is unnecessary.

Still further, since the multistage filtering apparatus can be regenerated in a short time, the operation rate of the multistage filtering apparatus is enhanced.

The combined effect of these advantages of the present invention reduces the operating cost of the system remarkably with a slight increase in the chemicals used for washing the multistage filtering apparatus, and thereby the economic effect of the brine purifying system is improved significantly.

Although the invention has been described in its preferred form with a certain degree of particularity, it is to be understood that many changes and variations are possible in the invention without departing from the scope and spirit thereof.

What is claimed is:

1. A multistage filtering apparatus, comprising:
   a) a filter assembly comprising a plurality of vertically stacked successively arranged filter units, each unit having an inlet and an outlet and the inlet of at least one unit is operably associated with the outlet of the unit immediately vertically above said one unit and the outlet of said one unit is operably associated with the inlet of the unit immediately vertically below said one unit;
   b) each of said units being substantially identical in size and design;
   c) each of said units includes an upper and a lower flange, and each lower flange is secured to an upper flange or an associated unit disposed immediately therebelow; and,
   e) filter means positioned in each unit, each filter means operably associated with the outlet of the associated unit for assuring filtering of fluid flowing from the associated inlet to the associated outlet.

2. The apparatus of claim 1, wherein:
   a) each unit includes a bottom plate and an upper plate; and,
   b) an aperture is formed in each plate for providing the associated outlet and inlet.

3. The apparatus of claim 2, wherein:
   a) each bottom plate forms a portion of the associated lower flange.

* * * * *